United States Patent [19]

Macchi née Danjon et al.

[11] 4,184,129
[45] Jan. 15, 1980

[54] SYSTEMS FOR TRANSMITTING DATA BETWEEN DISTANT LOCATIONS

[75] Inventors: Odile Macchi née Danjon, Orsay; Michel Levy, Massy; Cesar Macchi, Orsay, all of France

[73] Assignee: Agence Nationale de Valorisation de la Recherche (ANVAR), Neuilly-sur-Seine, France

[21] Appl. No.: 803,245

[22] Filed: Jun. 3, 1977

[30] Foreign Application Priority Data

Jun. 4, 1976 [FR] France .................... 76 17156

[51] Int. Cl.² .................... H04B 1/10; H04B 3/04
[52] U.S. Cl. .................... 333/18; 179/16 EA; 325/42; 364/724
[58] Field of Search .......... 179/16 E, 16 EA, 170.2; 325/42, 473; 333/18, 28 R, 70 T, 166; 364/724; 328/155; 178/88

[56] References Cited

U.S. PATENT DOCUMENTS

| | | | |
|---|---|---|---|
| 3,597,541 | 8/1971 | Proakis et al. | 179/170.2 |
| 3,617,948 | 11/1971 | Lucky | 333/70 T |
| 3,651,316 | 3/1972 | Gibson | 364/724 |
| 3,696,203 | 10/1972 | Leonard | 364/724 |
| 3,878,468 | 4/1975 | Falconer et al. | 325/42 |
| 3,962,637 | 6/1976 | Motley et al. | 325/42 |
| 4,027,250 | 5/1977 | Lang | 325/42 |
| 4,028,626 | 6/1977 | Motley et al. | 325/42 |
| 4,032,762 | 6/1977 | Caloyannides | 325/42 |
| 4,038,536 | 7/1977 | Feintuch | 333/18 |
| 4,061,977 | 12/1977 | Motley et al. | 333/18 |

Primary Examiner—Bernard Konick
Assistant Examiner—Randall P. Myers
Attorney, Agent, or Firm—Larson, Taylor and Hinds

[57] ABSTRACT

A system for transmitting data between distant locations comprises a modem at each location and a communication channel, typically a telephone line, whose transfer function has a principal component whose variation is slow and a second component whose variation is faster, but whose action is lesser. A correction device is located in the modem at the output of the channel and comprises an equalization filter constructed to compensate for the principal component and a digital adaptive network having a few coefficients and a low time constant, compatible with the frequency of the second component. The coefficients of the digital network may be adapted independently of those of the equalization filter.

16 Claims, 15 Drawing Figures

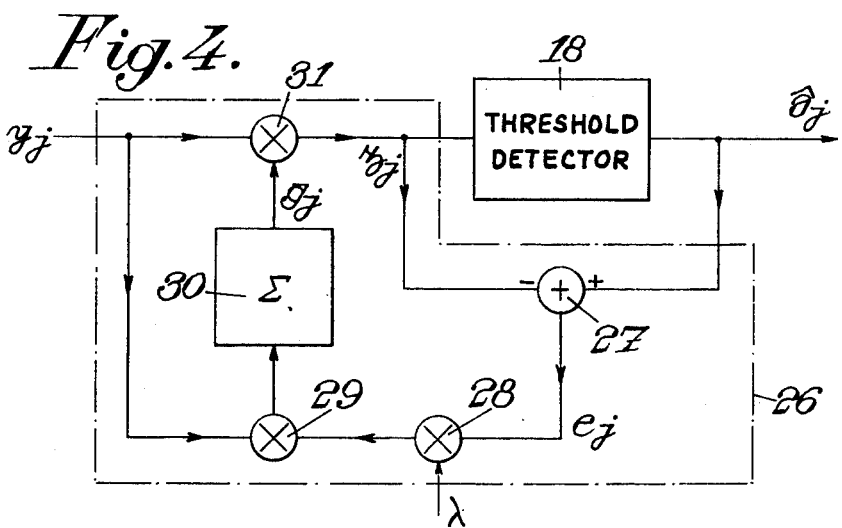
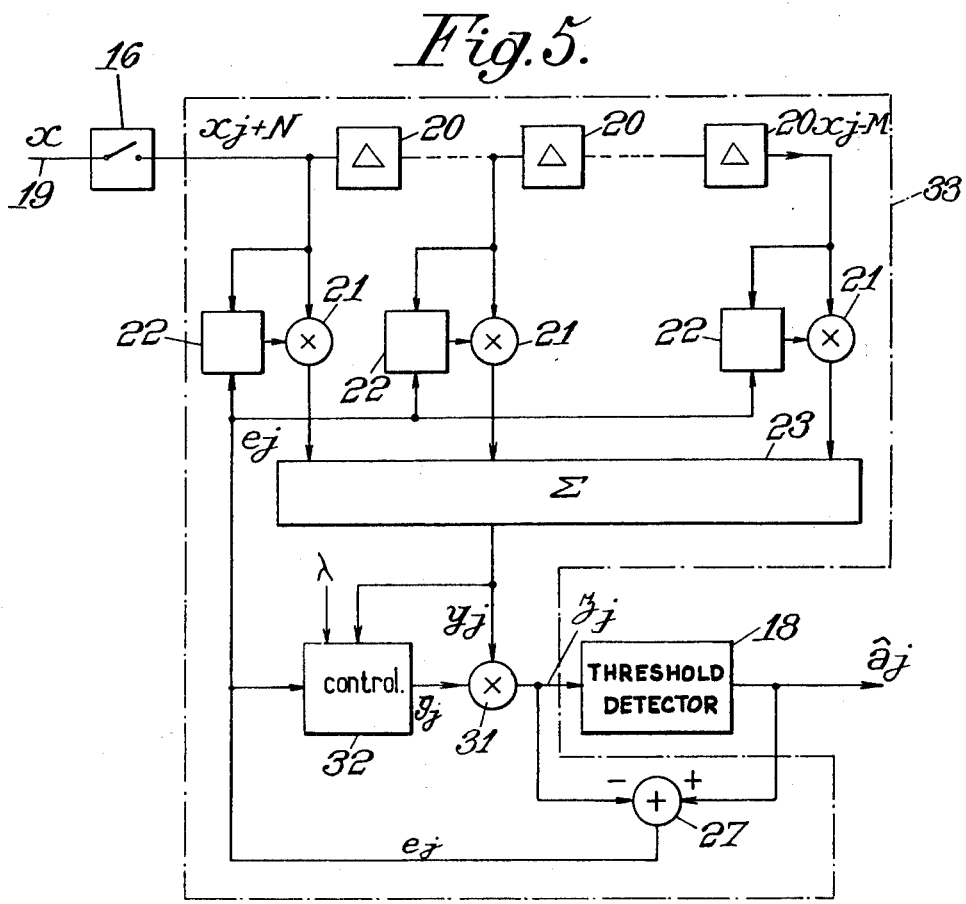

SYSTEMS FOR TRANSMITTING DATA BETWEEN DISTANT LOCATIONS

BACKGROUND AND SUMMARY OF THE INVENTION

The present invention relates to systems for transmitting data, in the form of successive quantified symbols, between two distant locations, using a communication channel and, more specifically, to a correction device constructed to be located at the output of the communication channel in a modulator-demodulator or modem, and to correct the distortions of the signal, whereby increasing the reliability of the system.

Before the invention is described, it may be useful to summarize some features of such data transmission systems and to list the notations which will be used in the following.

The systems to which the invention relates are for transmission of a sequence of data which will be referred to as $\{\ldots, a_j, \ldots\}$ which may have anyone of a plurality of quantified data levels (typically levels of $\pm 1$). The sub $j$ indicates the jth data symbol.

Usually, the jth data $a_j$ is transmitted as a proportional impulse designated as:

$$a_j \cdot d(t-j\Delta), \; t\in[j\Delta, \; (j+1)\Delta] \qquad (1)$$

in which:

$a_j$ is the quantified level of a data, $\Delta$ is the time interval between two successive data, i.e. the time interval which is allowed for transmission of data $a_j$, d is a narrow pulse.

The transmission uses a carrier at frequency $\nu_c$. Its initial phase will be designated as $\phi_o$. Two types of modulation are currently used.

1. In quadrature amplitude modulation, which will be referred to in the following as QAM, two sequences of data $(a'_j, a''_j)$ are transmitted on the communication channel each of them modulating one of two quadrature carriers; then the transmitted signal can be represented by the real part of the complex signal:

$$D(t)=\Sigma_j a_j d(t-j\Delta) \exp i(2\pi\nu_c t-\phi_o) \qquad (1)$$

where:

$$a_j = a'_j + i\, a''_j \qquad (2)$$

and d(t) is a real function.

2. In single side band modulation, currently referred to as SSB, the data $a_j$ is real and it is passed through two quadrature filters. Then, the transmitted signal takes also the form indicated by the formula (1) above, but d(t) is then a complex analytical function.

Last, a mention should be made of doubleside band modulation or DSB which uses a single carrier. Formula (1) is still valid, but then $a''_j=0$ and d(t) is a real function.

The communication channel acts as a filter causing distortion in the transmitted signal and generates intersymbol interferences, designated as ISI. ISI is all the more significant as the bit rate is higher; at the currently used 9600 bts rate, systems suffer very much from it and may provide inaccurate results.

In such systems, demodulation by the modem at the output of the channel implies generating two quadrature signals, at least for QAM systems. This is done using any one of several methods.

1. In a first approach, which is quite conventional, demodulation is achieved by multiplication with two quadrature carriers and low pass filtering, as will be shown later. In SSB and DSB systems, demodulation is not always performed with two quadrature carriers, but sometimes with only one carrier in order to simplify the receiver as shown in FIG. 1 for DSB. However, this simplification adversely affects the performances of the system, if ISI is severe.

After demodulation, the complex received signal $$x(t)=x'(t)+i.x''(t) \qquad (3)$$

can be written as:

$$x(t)=\Sigma_j a_j s(t-j\Delta) \exp i\phi + b(t) \qquad (4)$$

where:

$\phi$ is the phase error $\phi_1 - \phi_o$ between the received carrier and the demodulating reference wave;

b(t) is the complex noise on the two quadrature channels, collected by the transmission channel;

s(t) is the complex impulse response of the channel, including the modulating and demodulating filters;

When s(t) is complex, which is usually the case, the two quadrature signals interfere between each other. Attempts have already been made to suppress said intersymbol interference by providing a filter known as an "equalizer", which has a transfer function as close as possible to the inverse of the channel filter. This equalizer usually comprises a sampler and a transversal digital filter. The sampling phase $\tau_o$ is selected at a value close to the time where s(t), i.e. the response of the channel, is maximum in an attempt to have it as close as possible to $\tau$ (delay due to the channel). The sampled signal is then:

$$\ldots, x_o=x(\tau_o), \ldots, x_j=x(\tau_o+j\Delta), \ldots \qquad (5)$$

and the equalized signal is:

$$y_j = \sum_{k=-N}^{M} h^j_k \cdot x_{j-k} = \vec{H_j}^T \cdot \vec{X_j} \qquad (6)$$

where:

$$\vec{X_j} = (x'_{j+N} + ix''_{j+N}), \ldots, (x'_j + ix''_j), \ldots, \\ (x'_{j-M} + ix''_{j-M}) \qquad (7)$$

and $\vec{H_j}^T$ is the tap vector of the equalizer at time $j\Delta$:

$$\vec{H_j}^T = \vec{H'_j}^T + i\, \vec{H''_j}^T = (h'_{-N} + ih''_{-N}), \ldots, (h'_o + ih''_o), \\ \ldots, (h'_M + ih''_M); \qquad (8)$$

$\vec{H_j}^T$ is a complex vector; $N+M+1$ is the number of taps of the equalizer.

Demodulation of SSB or DSB may be performed only on one carrier. Then:

$$x''_j=0, \; \vec{H''_j}^T=0. \qquad (9)$$

2. A different approach, known as "phase splitting" has been described in a paper by R. D. Gitlin et al entitled "Passband equalization for differentially phase modulated data signals" in Bell System Technical Journal, No. 2, February 1973, pp. 219-238.

According to the phase splitting method, the received signal is processed in a 90° phase shift filter which provides a second signal in quadrature with the received signal at the input of a demodulator. A sampler and a complex equalizer are located downstream of the modulator and operate along the same line as the equalizer of the first method for delivering a complex output. Then, demodulation is done digitally by complex multiplication of this output with $$e^{-i(2\pi\nu_c j\Delta - \phi 1)}.$$

Such a scheme is generally referred to as pass-band equalization. A corresponding network will be described in more detail hereinafter with reference to FIG. 9a. In FIG. 9b, the equalization is performed after a complex multiplication by $e^{-(2i\pi\nu\Delta_c j\Delta - i\phi 1)}$. The systems of FIGS. 9a and 9b deliver equivalent outputs provided the complex coefficients $h_k^1$ and $h_k^2$ of the passband and base-band equalizers are related by $$h_k^1 = h_k^2 e^{(2i\pi\nu_c k\Delta)}, \text{ with } k = -N, \ldots, 0, \ldots, [M. \quad (10)$$

The latter system has a base band equalizer as in the conventional system (first method) which will be more completely described with reference to FIG. 8.

The above-described equalizers perform satisfactorily with an adaptive or learning algorithm which is of the type:

$$\vec{H}_{k+1} = \vec{H}_k - \mu \vec{x}_k^*(y_j - \hat{a}_j) \quad (11)$$

in the system of FIG. 8, or an equivalent algorithm in the phase splitting method, if, and only if, variations in the channel characteristics (and the variations of the carrier phase) are slow. In equation (11), $\mu$ is a step size which is a real quantity. $\vec{X}_k^*$ is the conventional representation for the complex quantity conjugate $\vec{X}_k$. As a practical rule, satisfactory results may be achieved when the signal/noise ratio is high (20 dB or more) and the phase offset is low and slowly variable.

However, in most telephone networks, the phase error $\phi$ which appears in equation (4) exhibits rapid changes, due to phase jitter or possibly to frequency offset. Now, the speed of adaptation or learning according to algorithm (11) is a function of the number of taps, and it is slow for an equalizer having a large number of taps. Since such a large number of taps is necessary to achieve satisfactory equalization, conventional equalizers cannot remove phase jitter which may have a frequency higher than 100 cps and a large amplitude (30° peak to peak or more).

Numerous attempts have been made to solve the problem. An approach has been described by D. D. Falconer in "Analysis of a gradient algorithm for simultaneous passband equalization and carrier-phase recovery" (The Bell System Technical Journal, Vol. 55, No. 4, April 1976, pp. 409-428). It consists in evaluating the phase error $\phi$ and introducing the estimated value in the demodulation process. That approach may compensate for phase errors, but is unable to correct for amplitude distortions due to variable attenuation.

It is also old in the art (U.S. Pat. No. 3,935,535 to Motley et al) to provide a correction device having an equalizer for removing ISI and a phase correction network having a phase lock circuit for error evaluation. The device relies for operation on the periodic transmission of a special sequence of data and this constitutes a severe limitation on the estimation of the phase error.

Still another prior art correction device (French Pat. No. 2,283,606 to Compagnie IBM France) comprises an equalizer in series relation with a phase detector and a phase filter without adaptation features. Other systems (see for instance IEEE International Conference on Communications, June 11-13, 1973, pp. 2-31 to 2-38) are similar to that of Pat. No. 3,935,535.

It is an object of the invention to provide an improved device for correction of distortions due to the communication channels in data transmission systems.

It is another object of the invention to provide a device which makes it possible to dispense with phase evaluation and which is carried out by the use of linear processing only.

It is a more specific object of the invention to provide a device permitting accurate data transmission in presence of simultaneous fast phase jitter and ISI.

According to an aspect of the invention, there is provided a correction device for a system for transmitting data between remote locations and the like, using a communication channel whose transfer function includes a main component which does not vary or varies slowly and at least another component whose time constant is substantially lower and whose effect is lesser. The device is located between the output of the channel and detection circuits. It comprises a cascade arrangement of an equalizing filter and a digital self-adapting network associated with a control system for operating according to a learning algorithm. The equalizing filter is designed for removing the effects of said main component. The digital network constitutes a transversal adaptive filter having a small number of taps and a short time constant as compared to the speed of variation of the other component. The control system for the digital network can use a linear algorithm of the "gradient" type for adapting the tap coefficients.

When the digital network is for overcoming the effects of phase jitter on telephone lines, it is generally sufficient to provide it with only one (possibly complex) coefficient. In other cases, it may be preferable to design the filter with two or three taps, or even to use two network stages or even more in cascade; then, the number of taps of the stages will usually be decreasing as they are farther along the data path. The invention is not limited to phase jitter on telephone lines. It applies whenever a communication channel introduces at least two types of linear distortion having distinct ranges in the variation speed, the prevalent one varying more slowly.

It may be that the major or main effect is invariant or constant: then ISI may be suppressed by the use of an equalizing filter which needs not to be digital and adaptive. In case of very slow variation, periodic adjustment by an operator may be sufficient: such is the case for communication on cables. Then, the adaptive network is adapted to track or follow any fast variation of the transfer function of the channel, for instance for correcting timing jitter on cables with repeaters.

SHORT DESCRIPTION OF THE DRAWINGS

FIG. 4 is a block diagram of an adaptive digital network for use in the receiver, for correction of phase jitter, of FIG. 3;

FIG. 5 is a block diagram of an assembly comprising an equalizing filter as a first stage and a phase jitter suppression adaptive network as a second stage, for a single carrier demodulation receiver according to another embodiment of the invention;

Figure 6:
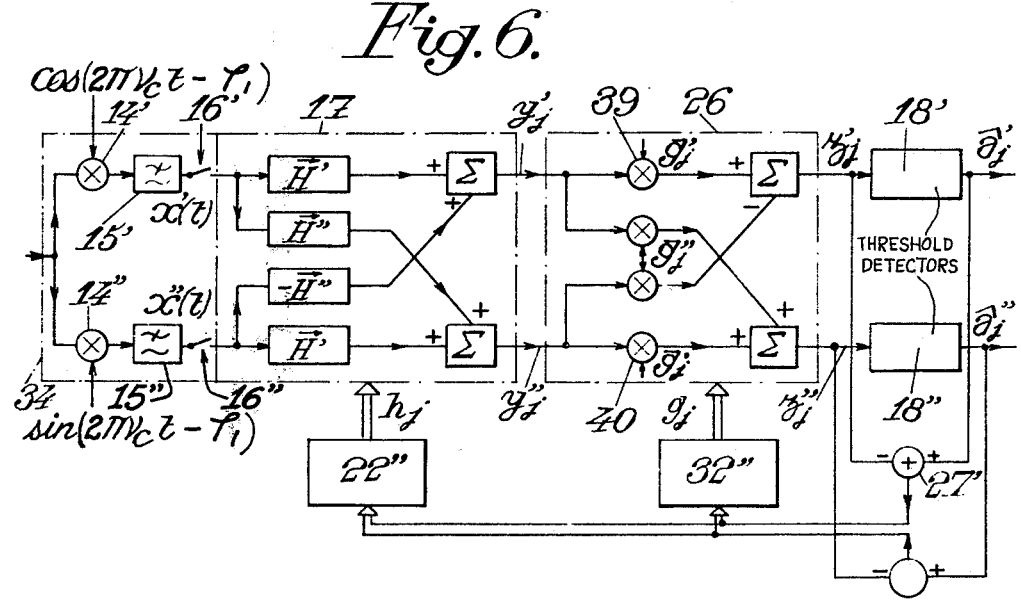
Figure 7:
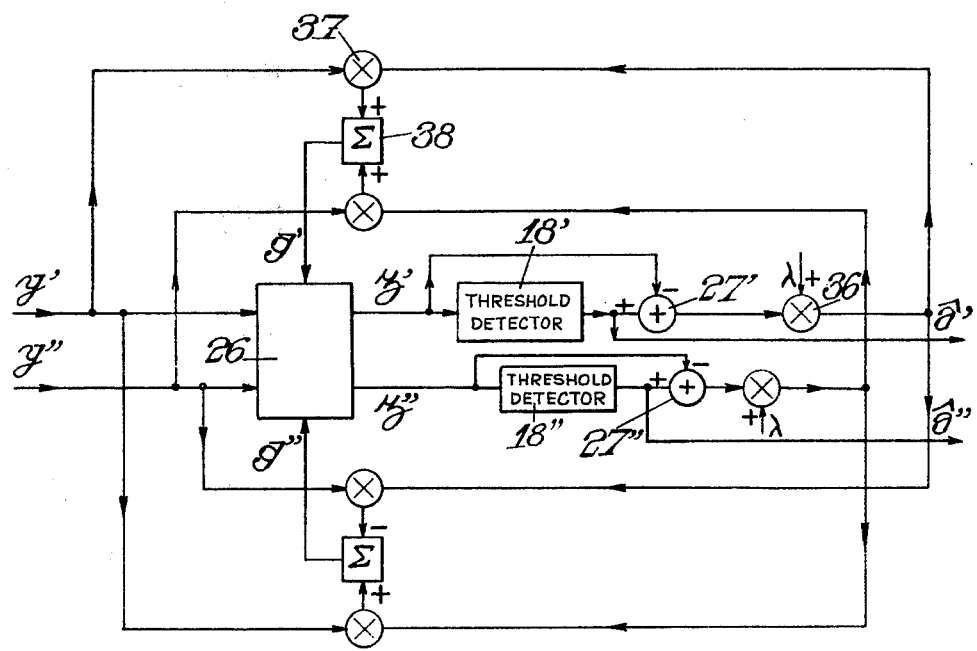
Figure 8:
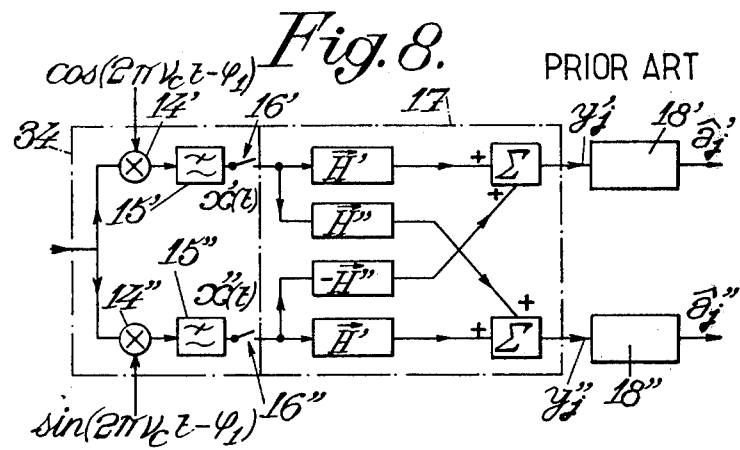
Figure 9A:
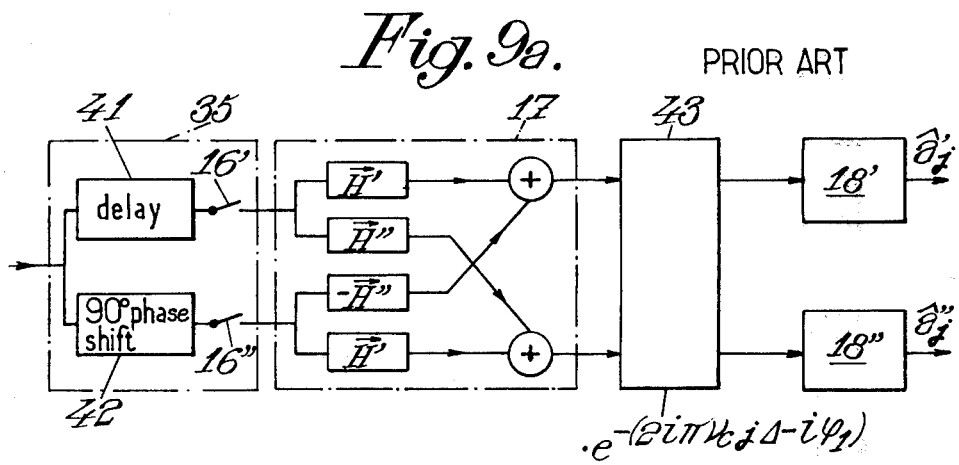
Figure 9B:
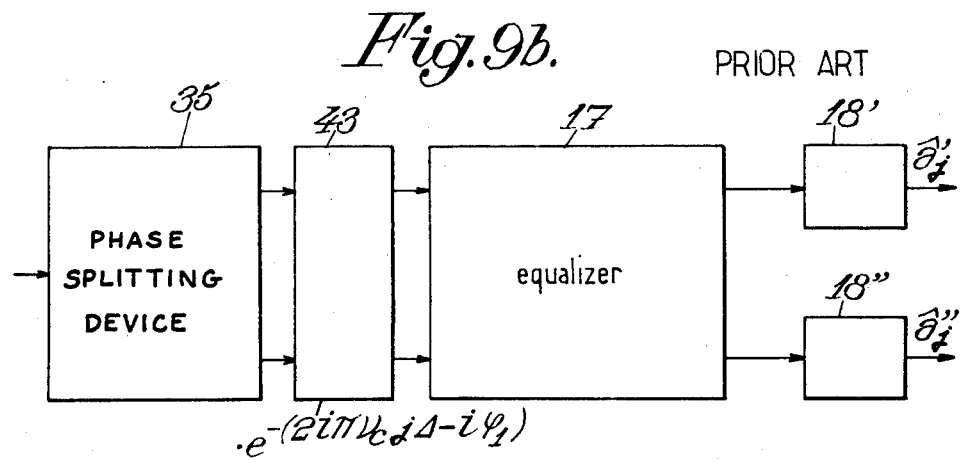
Figure 10:
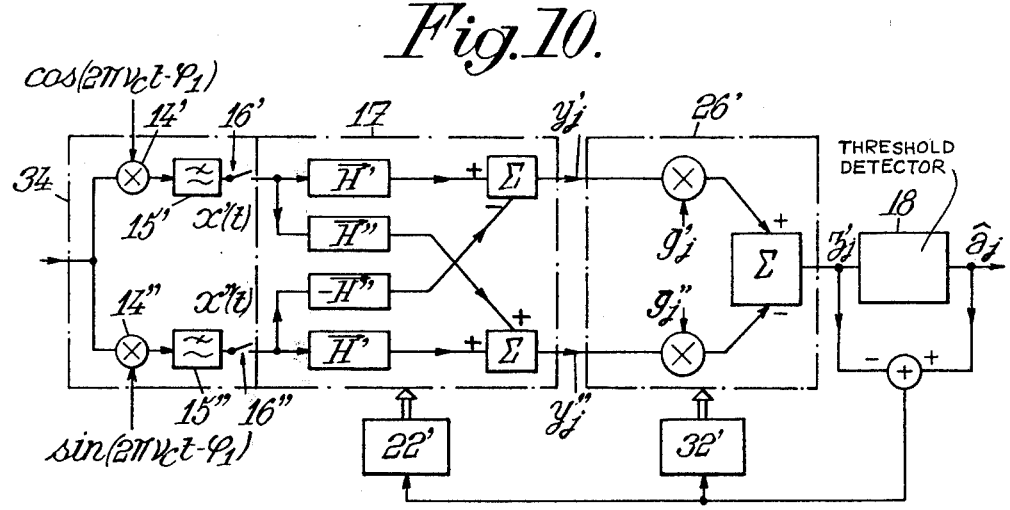
Figure 11:
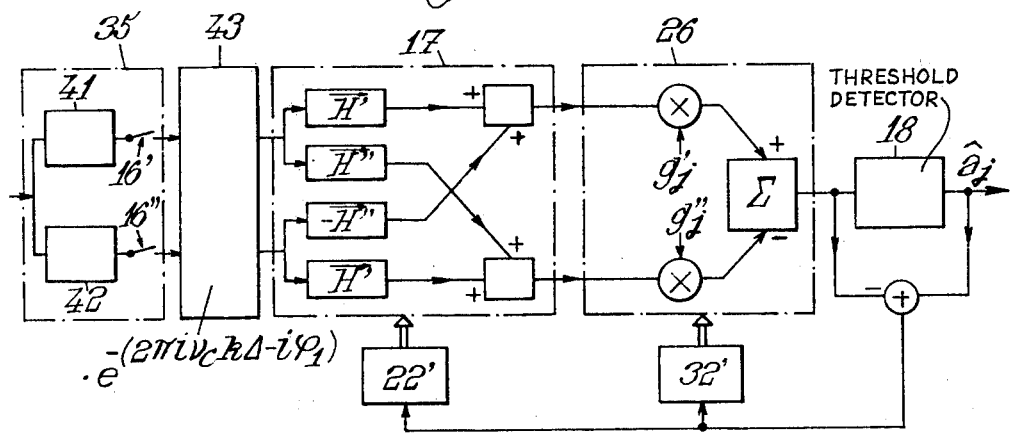
Figure 12:
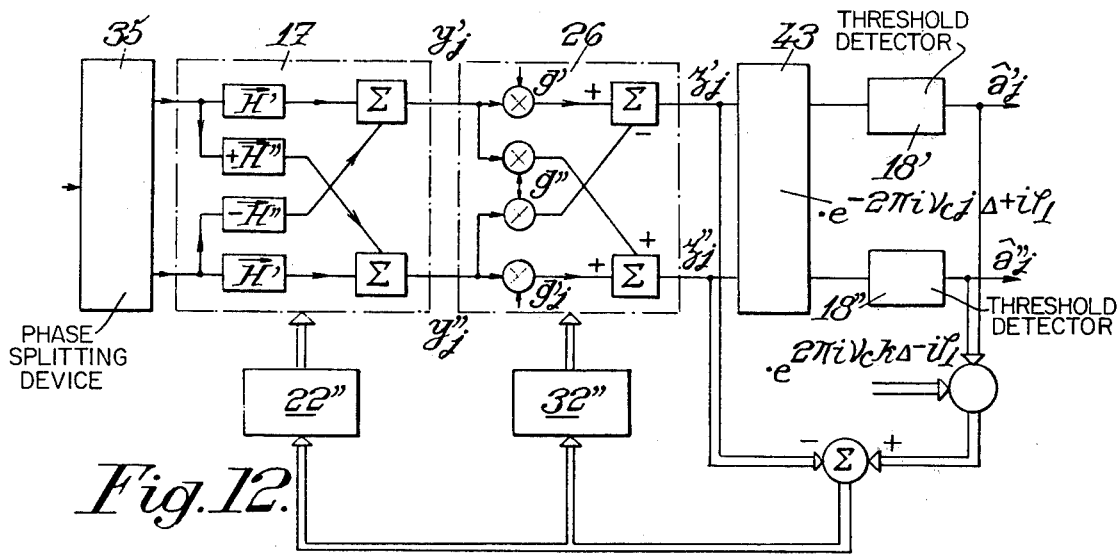
Figure 13:
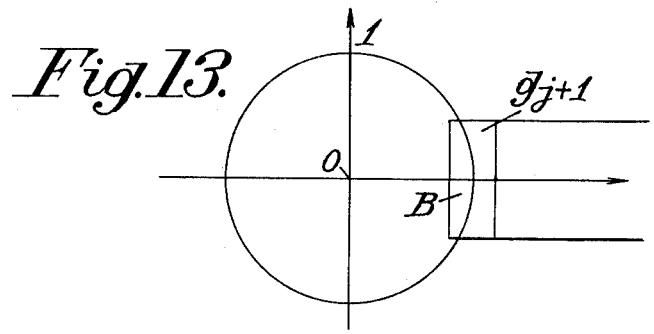
Figure 14:
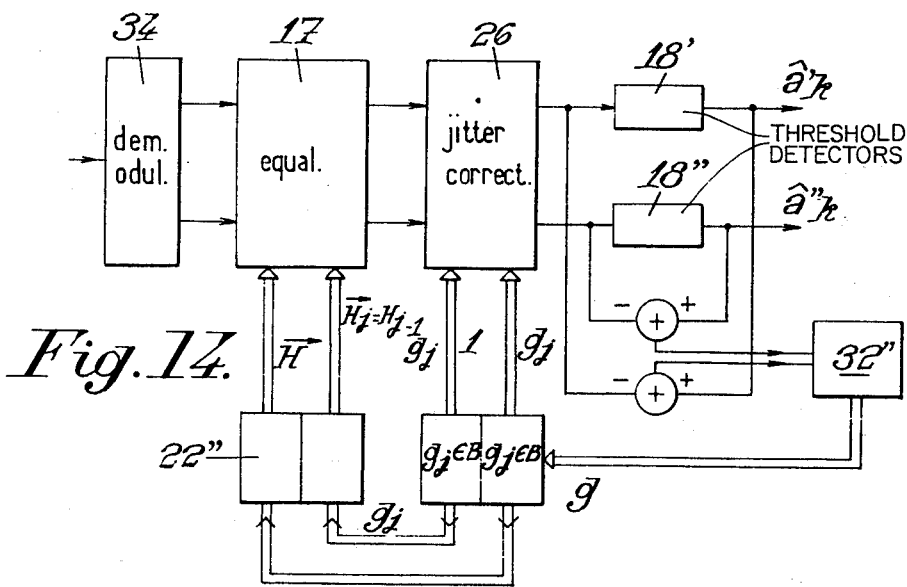

FIG. 6, similar to FIG. 5, has a two stage complex equalizer for QAM system with conventional demodulation according to still another embodiment of the invention;

FIG. 7 illustrates another adaptive digital network of the embodiment of FIG. 6;

FIG. 8 is a block diagram of a QAM receiver with demodulation of in phase and quadrature carriers and base-band complex equalization;

FIGS. 9a and 9b are block diagrams of two embodiments of a QAM receiver with phase splitting, respectively with passband and base-band complex equalization;

FIG. 10, similar to FIG. 8, is a diagram of a receiver for SSB or DSB system with in phase and quadrature carrier demodulation according to the invention;

FIG. 11 is a block diagram of a two stage adaptive base-band equalizer for SSB or DSB systems with phase splitting demodulation;

FIG. 12 is a block diagram of a two stage complex equalizer for QAM system with pass band equalization;

FIG. 13 is an illustration of the test area for adaptation of the coefficients of the second stage of the equalizer;

FIG. 14 is a block diagram of an improved two stage complex equalizer for QAM system limiting the variations of the coefficients of the second stage.

DETAILED DESCRIPTION OF PREFERRED EMBODIMENTS

Embodiments of the invention specifically adapted to different types of modulation methods will be described successively.

1. SSB and DSB systems with a single demodulation signal

Figure 1:
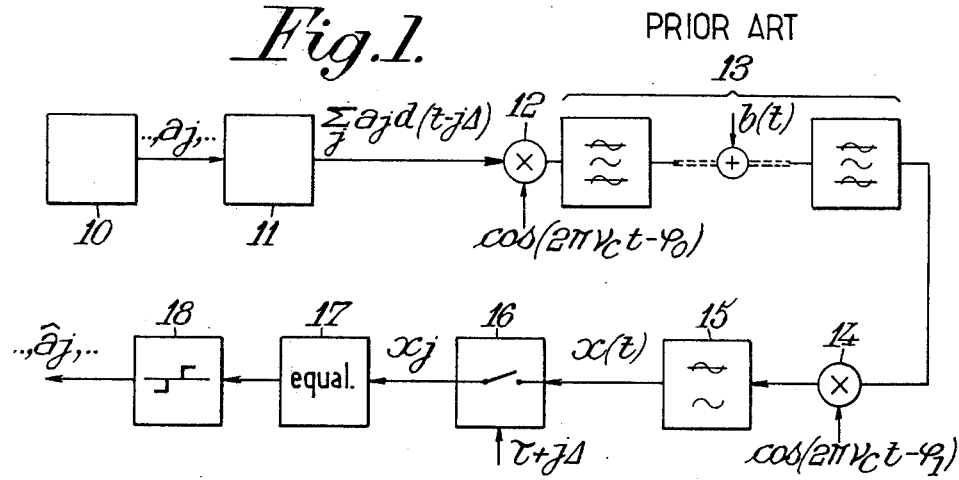
FIG. 1 is a simplified block diagram of a DSB communication system using a single carrier, with base-band equalization.

Referring to FIG. 1, there is shown a single carrier DSB transmission system which includes a transmitter, a communication channel and a receiver.

The transmitter may be regarded as having:

a source of quantified data 10, generating the sequence $a_j$;

a shaping filter 11, whose output delivers the sequence $a_j d(t - j\Delta)$ at a rate which is for instance 9600 bps;

a modulator 12 which receives the data symbols on one input and the carrier wave $\cos(2\pi\nu_c t - \phi_o)$ on another input.

The communication channel 13 (for example a telephone line) receives incoming data and delivers data which are affected with ISI and noise $b(t)$.

The receiver comprises:

a demodulator connected to the output of the channel, comprising a synchronous demodulator 14 and a low pass filter 15;

a sampler 16;

an equalizing filter 17;

a threshold detector device 18.

In the case of SSB system, the transmitter is different but usually the receiver is identical to that which has just been described.

It is known that there exists an optimal tap vector for the equalizer 17 of conventional type, which minimizes the mean square deviation between the transmitted data and the output of equalizer 17. This tap vector can be determined through a learning algorithm of a type similar to (11), $X_j$, $H_j$, $Y_j$ and $a_j$ being real rather than complex quantities.

Figure 2:
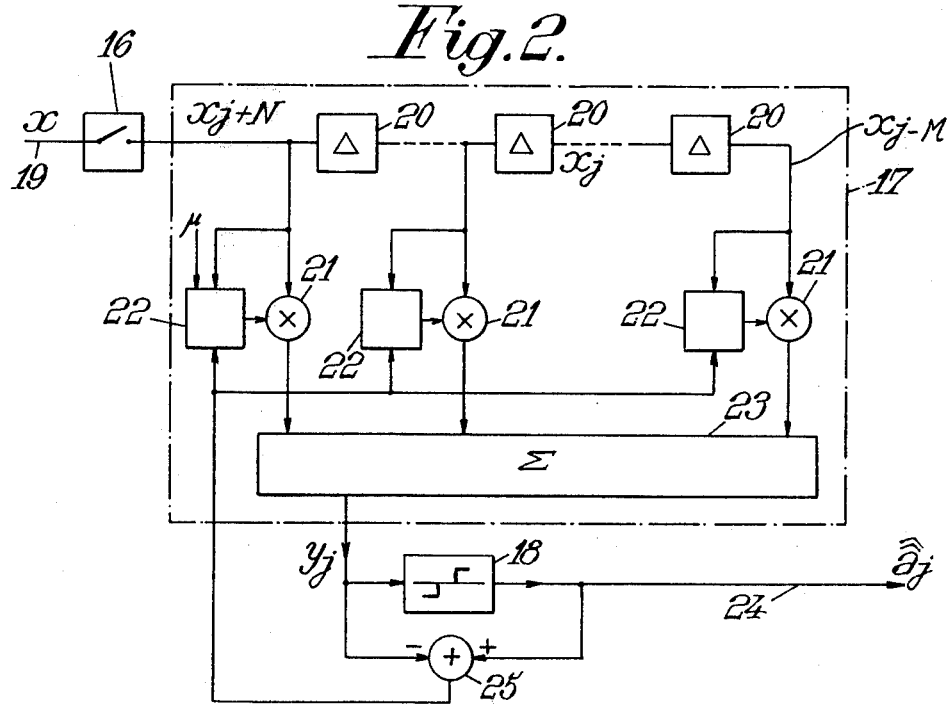
FIG. 2 is a block diagram of an equalizer which may be used in the system of FIG. 1, demodulation being carried out on a single carrier.

Referring to FIG. 2, by way of example, there is shown an adaptive digital equalizer 17 whose input 19 receives the sampled signal. The samples enter a cascade of $N+M$ delay lines 20 (N and M being integers). Each delay line 20 provides a delay $\Delta$. $N+M$ samples, referred to as $x_{j+N}, \ldots x_j, \ldots, x_{j-M}$, are thus available at the same time and may be simultaneously applied to respective digital multipliers 21. Each multiplier receives on its other input the corresponding coefficient $h_{-N}, \ldots, h_o, \ldots, h_M$, which is provided by a control circuit 22. The output of all multipliers are applied to a summation accumulator 23 whose output signal $$y_j = \sum_{k=-N}^{M} h_k^j \cdot x_{j-k}$$

is applied to a threshold detector 18. The provisionally estimated data $\hat{a}_j$ is made available at the output 24 of detector 18.

Adaptation is performed by subtracting signal $Y_j$ from $\hat{a}_j$ in an adder 25. The evaluated deviation is directed to all circuits 22 as a control signal in order to compute the $N+M+1$ iterated coefficients; as a result of the jth iteration, coefficient $h_k$ is modified from value $h_k^j$ to value $h_k^{j+1}$ according to:

$$h_k^{j+1} = h_k^j + \mu x_{j-k}(\hat{a}_j - y_j) \tag{13}$$

where $\mu$ is a preset positive step.

The adaptation speed of the usual equalizers 17 is in direct relation with the inverse of the number of taps (which should be large to ensure satisfactory equalization). As a consequence, while such an equalizer slightly reduces the slow jitter components, it cannot follow quick changes.

The invention overcomes the difficulty while it requires only simple design changes. It takes advantage of the fact that, once adapted, the equalizer provides an output signal substantially devoid of ISI. Thus, this equalizer can act as a first stage of a composite assembly and cooperate with a second stage having few coefficients (for example one), because only ISI between adjacent symbols remains and has been quite attenuated. Numerous embodiments may be used while retaining the basic design shown in FIG. 3.

(a) In a first embodiment, the two stages (i.e. the equalizer and the jitter suppressing digital network) are controlled independently. Then the first stage and its associated control circuit have the same general structure as an equalizer 17 of the prior art. The second stage and its control circuit may be as shown in FIG. 4, in an embodiment with a single tap.

Figure 3:
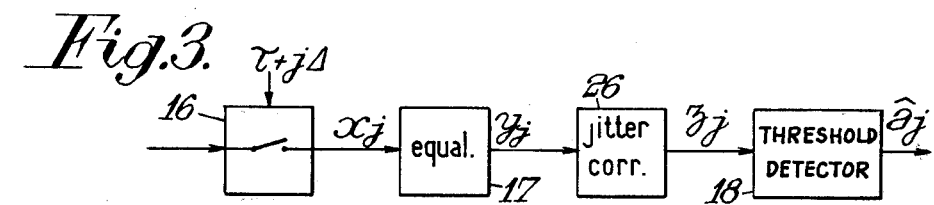
FIG. 3 is a block diagram of a receiver derived from that of FIG. 1, but according to an embodiment of the invention.

Referring to FIG. 3, the two stages 17 and 26 replace the conventional equalizer 17 for a transmission system of the type of FIG. 1, with a receiver using single carrier demodulation. The assembly needs two thresholds detectors, one for each stage.

On FIG. 3, for simplicity, the components corresponding to those of FIG. 1 have the same reference number. The adaptation speed of the second stage 26, which has one coefficient, can be very high and consistent with the usual jitter frequencies.

In the second stage illustrated on FIG. 4, there are found components similar to those of the conventional equalizer 17. In adder 27, the estimated deviation $e_j$ between output $\hat{a}_j$ of the threshold detector and output $z_j$ of network 26 is formed. Deviation $e_j$ is multiplied by the iteration step valve or size in multiplier 28, then by the input valve $y_j$ in multiplier 29. A summing accumulator 30 receives the successive outputs of multiplier 29. Output $z_j$ in response to input $y_j$ is delivered by multiplier 31.

Thus, it appears that the second stage 26 operates according to the following algorithm:

$$\begin{cases} z_j = g_j \cdot y_j, & (14) \\ g_{j+1} = g_j + \lambda(-z_j + \hat{a}_j) y_j, & (15) \end{cases}$$

where $a_j$ is derived from $z_j$ by the threshold detector 18. The step size $\lambda$ is selected much larger than the step size $\mu$ of (13), for instance, ten or twenty times larger. Such a step size renders it possible to track fast changes in the channel characteristics, for instance track rapid phase jitter. Since stage two has one coefficient, it will be simple in design and low in cost (about one tenth of that of stage one 17).

(b) While in the foregoing reference has been made to the insertion of an adaptive filter after a classical equalizer, with the two filters performing independently, this is not so in other embodiments. The performances can often be improved by operating the two filters in a dependent way, i.e. by correlating their operations, as will be examplified now.

In a second embodiment, stage one is controlled in dependence on stage two. This may be done by replacing the control circuit operating according to equation (13) by a circuit which operates according to other algorithms (while equation (15) is retained).

A first possibility consists of using:

$$h_k^{j+1} = h_k^j + \mu(\hat{a}_j - y_j) \cdot x_{j-k} \qquad (16)$$

Another possibility is represented by:

$$h_k^{j+1} = h_k^j + \mu(\hat{a}_j - z_j) x_{j-k}, \qquad (17)$$

where $\hat{a}$ is the output of the threshold detector following stage two. Then, the two adaptive filters with their control constitute a single adaptive system 33, represented in block diagram form on FIG. 5 in the case of (17).

It may be noted that control according to equation (17) provides the best performances and requires the simplest system, because it uses a single threshold detector (instead of one in stage 17 and one in stage 26 in the embodiment of FIGS. 2 and 4) and a single deviation ($\hat{a}_j - z_j$) is involved instead of $\hat{a}_j - y_j$ in stage 17 and $\hat{a}_j - z_j$ in stage 26. The control device 32 operates as 22 but with a step size which is $\lambda$ rather than $\mu$. The other reference numbers in FIG. 5 correspond to those of FIGS. 2 and 4.

2. SSB and DSB systems with quadrature demodulation signals

When quadrature demodulation is used, systems of the type illustrated in FIGS. 10 and 11 may be selected.

When the channel impresses severe distortion, it may be that receivers which use single carrier demodulation do not perform satisfactorily and it becomes necessary to use two quadrature signals. These two signals can be derived by conventional quadrature demodulation as shown by 34 in FIG. 10, or by phase splitting device as shown at 35 in FIG. 11.

The first stage 17 is then complex with two real inputs $x'_j$, $x''_j$ and two real outputs $y'_j$, $y''_j$. The second stage 26 is illustrated with two real coefficients (one complex coefficient). It has only one real output $z'_j$:

$$z'_j = Y'_j g'_j - Y''_j g''_j \qquad (18)$$

In order to shorten the description, reference will be made only to the design in which stage one 17 is controlled in dependence with stage two 26 (as shown in FIG. 10) and independent control will be treated cursorily.

The adaptation systems 22' and 32' for the two stages are controlled by the real deviation $(\hat{a}_j - z'_j)$ according to the formulae:

$$\vec{H}_{j+1} = \vec{H}_j + \mu \vec{X}_j (\hat{a}_j - z'_j) \qquad (19)$$

$$g_{j+1} = g_j + \lambda y_j^* (\hat{a}_j - z'_j) \qquad (20)$$

Formula (19) may as well be replaced with:

$$\vec{H}_{j+1} = \vec{H}_j + \mu \vec{X}_j^* g_j^* (\hat{a}_j - z'_j) \qquad (21)$$

The control system 22' may be considered as consisting of two of the previous control system 22 of FIG. 5. One of them processes the real part $\vec{H}'_j$ of $\vec{H}_j$ and uses the real part $\vec{X}'_j$ of $\vec{X}_j$. The other similarly processes the imaginary part of $\vec{H}_j$ but with the opposite of the imaginary part of $\vec{X}_j$. The same comments are still valid when deriving the structure of 32' from that of 32.

The systems of the invention which have just been described and are for use with conventional quadrature demodulation can be used with quadrature phase splitting. This will appear from a comparison of FIG. 10 and FIG. 11, which is a simplified representation of a receiver with phase splitting and base-band equalization. No description of FIG. 11 (on which the same reference numerals as on FIG. 10 have been used to designate corresponding components) is necessary in view of the straightforward correspondence.

3. QAM (quadrature amplitude modulation) systems (FIGS. 6, 7, 8, 9 and 12)

Referring to FIGS. 6–9 and 12, devices for QAM systems will be described and it will appear that they are similar to those adapted for use with SSB and DSB systems. However, the receivers deliver two outputs $z'_k$ and $z''_k$ to the threshold detectors 18' and 18''. Moreover, the adaptive equalizer, which may be conventional, and the jitter correction network are controlled by two deviations instead of one real deviation in SSB systems. As with a single carrier transmission system, the two stages of the equalizer assembly can be controlled independently, or stage one can be controlled in dependence with stage two. The two approaches will be described successively.

(a) In the embodiment of FIG. 7, the two stages can be controlled independently. The first stage comprises two additional threshold detectors, and the control circuit uses the deviation between the outputs of the additional detectors and a respective output of the first stage.

The equations which represent operation of the first stage and the control thereof are equations (6) and (11) given above. The corresponding complex equalizer has not been illustrated on FIG. 7 as it has already been described and in addition is merely a modification of the design of FIG. 2 to accomodate complex values.

Referring to FIG. 7, there is shown a second stage using a single coefficient with its control circuit. Control of the second stage remains the same, irrespective of the way the first stage is controlled. Stage two operates according to the following equations:

$$z_j = g_j y_j, \quad (22)$$

$$g_{j+1} = g_j + \lambda(\hat{a}_j - z_j) y_j^* \quad (23)$$

In formulae (22) and (23) $g_j$, $z_j$ and $\hat{a}_j$ are complex quantities:

$$\begin{cases} g_j = g'_j + i g''_j, \\ z_j = z'_j + i z''_j, \\ \hat{a}_j = \hat{a}'_j + i \hat{a}''_j, \end{cases} \quad (24)$$

and $\hat{a}'_j$, $\hat{a}''_j$ are the outputs of the threshold detectors $18'$ and $18''$ of FIG. 7.

(b) In other embodiments, such as those illustrated in FIGS. 6 and 12, the first stage is controlled in dependence with the second stage, whereby the performances of the system are improved and the number of threshold detectors is decreased.

For that purpose, operation according to equation (11) is replaced with operation according to one of equations (25), (26) and (27):

$$\vec{H}_{j+1} = \vec{H}_j + \mu(\hat{a}_j - z_j)\vec{X}_j, \quad (25)$$

$$\vec{H}_{j+1} = \vec{H}_j + \mu(\hat{a}_j - z_j)g_j^*\vec{X}_j^* \quad (26)$$

$$\vec{H}_{j+1} = \vec{H}_j + \mu(\hat{a}_j g_j^* - y_j)\vec{X}_j^* \quad (27)$$

Equation (25) is applicable whatever the number of taps of stage two is, particularly if it is greater than one; on the other hand, equations (26) and (27) apply only to a one coefficient second stage, for instance of the type illustrated on FIG. 7.

Referring to FIG. 6, there is shown how the invention may be implemented using equation (25). The controlling action of device $32''$ is similar to that of the device of FIG. 7; the $N+M+1$ complex coefficients of the first stage are controlled by a system similar to $32'''$ which commands adaptation of $g_j$. For that reason, it has not been found necessary to describe control circuit $22''$.

The controls according to each of the three equations (25)–(27) provide substantially equivalent performances. The first one will however generally be preferred since it requires less mathematical operations.

The foregoing description assumes that conventional quadrature demodulation is used. However, an apparatus according to the invention may as well be used with quadrature phase splitting: it will be noted that, if phase splitting base-band equalization is performed as in FIG. 9b, a comparison with FIG. 8 (conventional demodulation) makes it apparent that the complex equalizer 17 of FIG. 9b can be replaced by the two stage equalizer which has just been described, as was done with conventional demodulation, for developping the inventive device of FIGS. 6 and 7 from that of FIG. 8.

In the case of passband equalization, an overall description of the two stage equalizer is unnecessary since the design is not changed except for the control system of the two stages. Equations (23), (25), (26) and (27) are then respectively replaced with:

$$g_{j+1} = g_j + \lambda(\hat{a}_j e^{2i\pi\nu j\Delta - i\phi} 1 - z_j) y_j^* \quad (23')$$

$$\vec{H}_{j+1} = \vec{H}_j + \mu(\hat{a}_j e^{2i\pi\nu j\Delta - i\phi} 1 - z_j)\vec{X}_j^* \quad (25')$$

$$\vec{H}_{j+1} = \vec{H}_j + \mu(\hat{a}_j e^{2i\pi\nu j\Delta - i\phi} 1 - z_j) g_j^* \vec{X}_j^* \quad (26')$$

$$\vec{H}_{j+1} = \vec{H}_j + \mu(\hat{a}_j g_j^* e^{2i\pi\nu j\Delta - i\phi} 1 - y_j)\vec{X}_j^* \quad (27')$$

For clarity, the block diagram of a receiver corresponding to equations (23') and (25') has been illustrated on FIG. 12, where like reference numerals have been used to designate components similar to those which have been described previously. No description is again necessary.

While the devices which have been described hereinbefore provide satisfactory results, under exceptional circumstances they may fail to achieve equalization. This will be explained with reference to QAM transmission systems, in which the spatial diagram of the data is invariant irrespective of rotations equal to $\pi/2$ or an integer number of $\pi/2$. Consequently, if the phase error $\phi$ between the received carrier and the demodulating reference wave exceeds $\pi/2$ or $\pi, \ldots$ it may be that data are erroneously decoded, particularly in those systems which can track rapid phase jitter. The use of a two stage equalizer according to a further aspect of the invention, results in suppression of this type of errors, while keeping the possibility of tracking fast changes in the phase error.

For that purpose, the variations in channel characteristics are stored, while the possibility of tracking these changes is retained. The second stage with a small number of taps has a short time constant: while it can follow fast changes, it cannot store information. Storage may be ensured by the first stage whose time constant is large due to the large number of taps. Therefore, the second stage will have fast but limited variations, while the first stage will keep memory of large and slow variations. Several algorithms may be used to implement that technique.

Referring to FIG. 13, there is shown an area B in the complex plane. The control system operating according to any one of equations (23) and (25)—or even (23) and (26), or (23) and (27)—is replaced by the following equation, respectively:

$$\vec{H}_{j+1}^1 = \vec{H}_j + \mu(\hat{a}_j - z_j)\vec{X}_j^*, \quad (25)$$

$$g_{j+1}^1 = g_j + \lambda(\hat{a}_j - z_j) y_j^*, \quad (23)$$

-continued $$\begin{cases} \overrightarrow{H_{j+1}} = \overrightarrow{H_{j+1}}^1; g_{j+1} = g^1_{j+1}, \text{ if } g^1_{j+1} \in B, \\ \overrightarrow{H_{j+1}} = g^1_{j+1} \overrightarrow{H_{j+1}}^1; g_{j+1} = 1, \text{ if } g^1_{j+1} \notin B. \end{cases} \quad (28)$$

In the case of phase jitter and frequency offset, the first stage will correct slowly varying and large amount of the phase error, and phase error of small amplitude, but varying rapidly will remain to be tracked by the second stage. Thus, the greater amount of frequency offset will be eliminated by the first stage, and the phase jitter by the second stage.

It will be appreciated that the control system may be simplified without detrimentally affecting the performances thereof. For that purpose, the following equations are used:

$$g^1_{j+1} = g_j + \lambda(\hat{a}_j - z_j) y_j^* \quad (23)$$

$$\begin{cases} \text{(a) if } g^1_{j+1} \in B, \text{ then} \\ \quad \begin{cases} g_{j+1} = g^1_{j+1} \\ \overrightarrow{H_{j+1}} = \overrightarrow{H_j} + \mu(\hat{a}_j - z_j) \overrightarrow{X_j}^* \end{cases} \\ \text{(b) if } g^1_{j+1} \notin B, \text{ then} \\ \quad \begin{cases} g_{j+1} = 1 \\ \overrightarrow{H_{j+1}} = g^1_{j+1} \overrightarrow{H_j} \end{cases} \end{cases} \quad (29)$$

A control circuit associated with the two stages and operating according to the set of equations (23) and (29) is illustrated in block form in FIG. 14 where like reference numerals and like representations as in the preceeding figures have been used.

Similar control systems can be derived from control equations (26) or (27), and in the case of passband equalization, from control equations (23'), (25'), (26') and (27').

The same procedure is valid for SSB and DSB systems with quadrature demodulation waves, as described by (19) and (20).

It will be apparent that the invention fulfils the above-mentioned requirements; it may be used even when an equalizer with a large number of taps (which may be higher than 100 on a sub-sea line) if necessary; the device of the invention is able to compensate amplitude variations as well as phase jitter when applicable.

We claim:

1. A correction device for a system for transmitting data between remote locations using a communication channel whose transfer function includes a main component which does not vary or varies slowly and at least another component whose time constant is substantially lower, and a receiver, comprising, in said receiver:
   an equalizing digital filter connected to receive the output from said channel and having a number of taps sufficient for compensating said main component substantially completely and delivering on its output a signal substantially devoid of intersymbol interference,
   a digital purely transversal self adaptive network connected to receive the output signal from said equalizing filter, having a number of taps lower than that of said filter and delivering at its output a signal substantially unaffected by said another component,
   and a control circuit for at least said network constructed to adapt the tap coefficients thereof, said control circuit having:
      first means connected to the output of said self adaptive network and providing an estimated value of the transmitted data,
      second means for comparing the output of said self adaptive network and said estimated data and for providing an error signal as a result of said comparison,
      and means connected to receive said error signal for adapting the tap coefficients of said self adaptive network according to an adaptive algorithm which is responsive to said error signal.

2. A correction device according to claim 1, wherein the equalizing filter has manually adjustable non adaptive coefficients.

3. A correction device according to claim 1, wherein the tap coefficients of said equalizing filter are adaptable by a second control circuit distinct from said control circuit for said network, said second control circuit comprising:
   third means connected to the output of said equalizing filter and providing a second estimated value of the transmitted data,
   fourth means for comparing the output of said equalizing filter and said second estimated value and for providing an error signal as a result of said comparison,
   and means for adapting the tap coefficients of said equalizing filter according to an adaptive algorithm which is responsive to the error signal provided by said fourth means.

4. A correction device according to claim 1, having a self adaptive network with a single tap coefficient, wherein the adaptive algorithm of said network is:

$$g_{j+1} = g_j + (\hat{a}_j - z_j) y_j^*$$

wherein,
   $g_j$ is the value of the single coefficient of the network for the jth iteration,
   $g_{j+1}$ is the value of the single coefficient of the network after the jth iteration,
   $\lambda$ is a positive preset iteration step size,
   $y_j^*$ is the conjugate value of $y_j$, output of the equalizing filter,
   $z_j$ is the output of the self adaptive network at instant j,
   $\hat{a}_j$ is the data estimated from the output $z_j$ of the digital self adaptive network at instant j, while it operates with coefficient $g_j$.

5. A device according to claim 4, for transmission using single side band modulation, wherein $g_j$ and $y_j$ are complex values, while $z_j$ is the real part of the output from said network and $\hat{a}_j$ is the data estimated from said real part.

6. A correction device according to claim 4, wherein the adaptive network has a single tap coefficient and wherein $g_{j+1}$ is a provisional value for the tap coefficients of said network and wherein means are provided for accepting $g_{j+1}$ if it lies within a predetermined domain B of the complex plane bound by predetermined limits for said adaptive network tap coefficients and for using $g_{j+1}$ for multiplying all the coefficients of the equalizing filter and for setting the tap coefficients of said network to one if $g_{j+1}$ is outside said domain B.

7. A correction device according to claim 1, for a system whose communication channel is a telephone line, for correcting the phase jitter, wherein said digital self adaptive network has a single tap coefficient and wherein said equalizing filter is a supplemental digital self adaptive network having at least 10 complex coefficients.

8. A correction device according to claim 1, wherein said self adaptive network has a single tap and wherein the adaptive algorithm of said network is:

$$g_{j+1} = g_j + \lambda f(\hat{a}_j - z_j) y_j^*$$

wherein:
- $g_j$ is the value of the single coefficient of the network for the jth iteration,
- $g_{j+1}$ is the value of the single coefficient of the network after the jth iteration,
- $\lambda$ is a positive preset iteration step size,
- $y_j^*$ is the conjugate value of $y_j$, output of the equalizing filter,
- $z_j$ is the output of the self operative network at instant j,
- $\hat{a}_j$ is the data estimated from the output of said network at instant j, while it operates with coefficient $g_j$,
- and f designates a predetermined function of $\hat{a}_j - z_j$.

9. A correction device according to claim 1, further comprising:
- means for comparing the output of said equalizing filter and said estimated value and for providing a second error signal as a result of said comparison,
- and means for adapting the tap coefficients of said filter according to an adaptive algorithm which is responsive to said second error signal.

10. A correction device for a system for transmitting data between remote locations using a communication channel whose transfer function includes a main component which does not vary or varies slowly and at least another component whose time constant is substantially lower and a receiver, comprising, in said receiver:
- an equalizing digital filter connected to receive the output from said channel and having a number of taps sufficient for compensating said main component substantially completely and delivering on its output a signal substantially devoid of intersymbol interference,
- a digital self adaptive purely transversal network connected to receive the output signal from said equalizing filter, having a number of taps lower than that of said filter, the output of said self adaptive network constituting the output of said correction device,
- and a control circuit for said filter and said network constructed to adapt the tap coefficients thereof, said control circuit having:
  - first means connected to the output of said self adaptive network and providing an estimated value of the transmitted data,
  - second means for comparing the output of said self adaptive network and said estimated value and for providing an error signal as a result of said comparison,
  - means for adapting the tap coefficients of said self adaptive network according to an adaptive algorithm which is responsive to said error signal and involves an iteration step,
  - third means connected to the output of said filter and providing a second estimated value of the transmitted data,
  - fourth means for comparing the output of said filter and said second estimated value and for providing a second error signal responsive to said comparison,
  - and means for adapting the tap coefficients of said filter according to an adaptive algorithm which is responsive to said second error signal, said adaptive algorithm involving an iteration step size which is smaller than that of the iteration step involved in the adaptive algorithm for said self adaptive network.

11. A correction device according to claim 10, wherein the control circuit is constructed and arranged to maintain the tap coefficients of said network within predetermined limits by modifying the tap coefficients of said equalizing filter responsive to said tap coefficients of said network reaching one of said limits.

12. A correction device according to claim 10, wherein said self adaptive network has a single tap and wherein the adaptive algorithm of said network is:

$$g_{j+1}^1 = g_j + \lambda(\hat{a}_j - z_j) y_j^*$$

wherein:
$g_{j+1}$ is equal to $$g_{j+1}^1 \text{ if } g_{j+1}^1 \in B \text{ and to one if } g_{j+1}^1 \notin B,$$

- $g_j$ is the value of the single coefficient of the network for the jth iteration,
- $\lambda$ is a positive preset iteration step size,
- $y_j^*$ is the conjugate value of $y_j$, output of the equalizing filter,
- $z_j$ is the output of the self operative network at instant j,
- $\hat{a}_j$ is the data estimated from the output $z_j$ of the digital self adaptive network at instant j; while it operates with coefficient $g_j$, and wherein the adaptive algorithm of said equalizing digital filter is:
- $g_j$ is the value of the single coefficient of the network for the jth iteration,
- $g_{j+1}$ is the value of the single coefficient of the network after the jth iteration,
- $\lambda$ is a positive preset iteration step size,
- $y_j^*$ is the conjugate value of $y_j$, output of the equalizing filter,
- $z_j$ is the output of the self adaptive network at instant j,
- $e^{-2i\pi v_c j \Delta - i\phi}$ is the digital demodulation multiplication factor,
- $\hat{a}_j$ is the data estimated from the demodulated output $z_j . e^{-2i\pi v_c j \Delta + i\phi}$ of the adaptive network operating with coefficient $g_j$,
- whereby $\hat{a}_j . e^{2i\pi v_c j \Delta - i\phi}$ represents the estimated data after demodulation.

13. A correction device for a system for transmitting data between remote locations using a communication channel whose transfer function includes a main component which does not vary or varies slowly and at least another component whose time constant is substantially lower, and a receiver, comprising, in said receiver:
- an equalizing digital filter connected to receive the output from said channel and constructed for compensating said main components substantially completely and for delivering on its output a signal substantially devoid of intersymbol interference,
a digital transversal self adaptive network connected to receive the output signal from said equalizing filter, having one tap and having a time constant smaller than that of said equalizing filter,
and a control circuit for at least said network constructed to adapt the tap coefficients thereof, said control circuit having:
first means connected to the output of said self adaptive network and providing an estimated value of the transmitted data,
second means for comparing the output of said self adaptive network and said estimated data and for providing an error signal as a result of said comparison,
and means connected to receive said error signal for adapting the tap coefficient of said self adaptive network according to an adaptive algorithm which is responsive to said error.

14. A correction device for a system for transmitting data between remote locations using a communication channel whose transfer function includes a main component which does not vary or varies slowly and at least another component whose time constant is substantially lower, and a receiver, comprising, in said receiver:
an equalizing pass band digital filter connected to receive the output from said channel and having a number of taps sufficient for compensating said main component substantially completely and delivering on its output a signal substantially devoid of intersymbol interference,
a digital transversal self adaptive network connected to receive the output signal from said equalizing filter, having a number of taps lower than that of said filter and arranged to demodulate the signal by complex multiplication,
digital demodulator means connected to receive the output of said adaptive network,
and a control circuit for at least said network constructed to adapt the tap coefficients thereof, said control circuit having:
first means connected to the output of said demodulating means and providing an estimated value of the transmitted data,
digital means connected to the output of said first means for remodulating said estimated data,
second means for comparing the input of said demodulator means and said remodulated estimated data and for providing an error signal as a result of said comparison,
and means connected to receive said error signal for adapting the tap coefficients of said self adaptive network according to an adaptive algorithm which is responsive to said error.

15. A correction device according to claim 14, whose self adaptive network has a single tap coefficient, wherein the adaptive algorithm of said network is:

$$g_{j+1} = g_j + \lambda \, (\hat{a}_j e^{2i\pi v_0 j\Delta - i\phi} - z_j) \, y_j^*$$

wherein:

$$\overrightarrow{H_{j+1}} = \overrightarrow{H_{j+1}}^1; \; g_{j+1} = g_{j+1}^1, \text{ if } g_{j+1}^1 \in B,$$

$$\overrightarrow{H_{j+1}} = g_{j+1}^1 \overrightarrow{H_{j+1}}^1; \; g_{j+1} = 1, \text{ if } g_{j+1}^1 \notin B.$$

$$\text{with } \overrightarrow{H_{j+1}}^1 = \overrightarrow{H_j} + \mu \, (\hat{a}_j - z_j) \, \overrightarrow{X_j}^*$$

in which:
$\vec{H}_j$ is the value of the coefficient vector of the equalizing filter for the $j^{th}$ iteration,
$\vec{H}_{j+1}$ is the value of the coefficient vector of the equalizing filter after the $j^{th}$ iteration,
$\mu$ is a positive preset iteration step size,
B is a domain of the complex plane bound by predetermined limits for said tap coefficients of the adaptive network.

16. A correction device for a system for transmitting data between remote locations having a communication channel whose transfer function includes a main component which does not vary or varies slowly and at least another component whose time constant is substantially lower and a receiver, comprising, in said receiver:
an equalizing pass band digital filter connected to receive the output from said channel for compensating said main component substantially completely and delivering on its output a signal substantially devoid of intersymbol interference,
a digital self adaptive network connected to receive the output signal from said equalizing filter, having a number of taps lower than that of said filter,
a digital demodulator means connected to receive the output of said adaptive network,
and a control circuit for said filter and said network constructed to adapt the tap coefficients thereof, said control circuit having:
first means connected to the output of said demodulating means and providing an estimated value of the transmitted data,
digital means connected to the output of said first means for remodulating said estimated data,
second means for comparing the input of said demodulator means and said remodulated estimated data and for providing an error signal as a result of said comparison,
and means connected to receive said error signal for adapting the tap coefficients of said filter and of said self adaptive network according to respective adaptive algorithms responsive to at least said error, with an iteration step size which is greater for said network than for said equalizer.

* * * * *